J. M. TRAVIS.
SUGAR BOWL.
APPLICATION FILED AUG. 25, 1913.

1,141,368.

Patented June 1, 1915.

WITNESSES:
Harry A. Benner
Jos. A. Michel

INVENTOR.
John M. Travis.
BY Emil Starek
ATTORNEY.

UNITED STATES PATENT OFFICE.

JOHN M. TRAVIS, OF ST. LOUIS, MISSOURI.

SUGAR-BOWL.

1,141,368.                Specification of Letters Patent.       Patented June 1, 1915.

Application filed August 25, 1913. Serial No. 786,489.

*To all whom it may concern:*

Be it known that I, JOHN M. TRAVIS, citizen of the United States, residing at St. Louis, State of Missouri, have invented certain new and useful Improvements in Sugar-Bowls, of which the following is a full, clear, and exact description, reference being had to the accompanying drawings, forming a part hereof.

My invention has relation to improvements in sugar-bowls; and it consists in the novel details of construction more fully set forth in the specification and pointed out in the claims.

Figure 1:
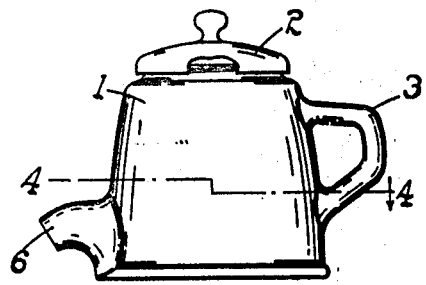
Figure 2:
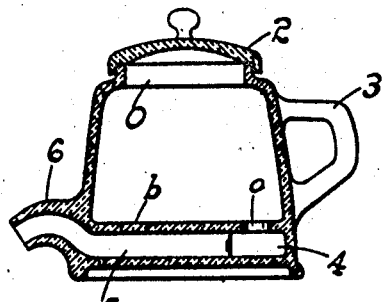
Figure 3:
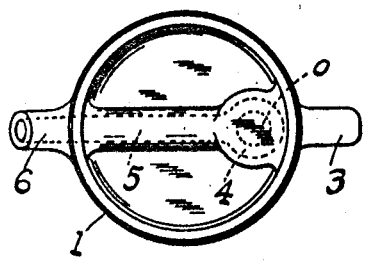
Figure 4:
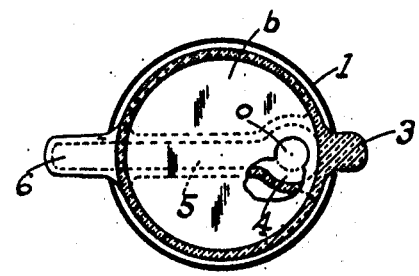
Figure 5:
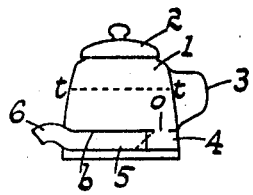
Figure 6:
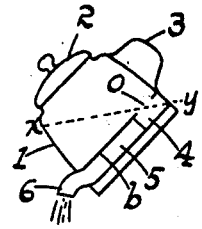

In the drawings, Figure 1 is a side elevation of my improved bowl; Fig. 2 is a middle longitudinal vertical section thereof; Fig. 3 is a bottom plan view; Fig. 4 is a horizontal section on the line 4—4 of Fig. 1; Fig. 5 is a diagrammatic view showing the normal position of the bowl when resting on a supporting surface; and Fig. 6 is a diagrammatic view showing the same tilted for discharging a measured quantity of its contents.

The present invention, although entitled as an improvement in sugar-bowls, is intended to cover any container, vessel, or receptacle, from which fluent material may be dispensed, as for example, sugar, salt, spices, cereals, pepper and the like, the object of the invention being to provide such a container with means which will discharge a measured quantity of the fluent material with a tilting or tipping of the container in a given direction, a quantity of the material corresponding to that of the volume discharged being automatically restored to the measuring receptacle with the righting of the container, and to be subsequently discharged with the next tilting of the container.

The advantages of the invention will be fully apparent from a detailed description thereof, which is as follows:—

Referring to the drawings, 1 represents a bowl or vessel provided with a charging opening O preferably closed by a screw-cap 2 (or its equivalent), the bottom $b$ of the bowl having a discharge opening (or openings) $o$ disposed at a point contiguous to the wall of the bowl and adjacent the handle 3. The opening $o$ communicates with a measuring chamber or compartment 4 adapted to hold a measured quantity of the fluent material, say a tea-spoonful, the discharge from said chamber communicating with the passage-way of a tube or conduit 5, which in turn discharges into the base of the delivery spout 6 leading from the bowl wall diametrically opposite the handle 3, the intake of the spout curving gently to the discharge end of the passage of the conduit 5. The chamber 4 may be said to constitute the basal enlargement of the passage-way of the conduit 5, the capacity of said chamber being such as to hold any predetermined quantity of material, whereby said chamber serves as a measuring device for the material to be dispensed or abstracted from the bowl with a tilting of the bowl in the direction of the spout, as will more fully hereinafter appear. As stated above, the measuring chamber may be made to contain a tea-spoonful, or any multiple thereof, or any other predetermined quantity of material depending on the use to which the container is to be put.

The operation is substantially as follows:—Ordinarily, the vessel rests on a table or other support, the bottom $b$ being raised above the lower edges of the peripheral walls of the vessel, whereby said bottom and the chamber 4 and conduit 5 clear the supporting surface on which the vessel rests. The bowl is charged through the opening O and wholly or partially filled with powdered or granulated sugar or other fluent material after which the screw-cap 2 is attached. As the bowl rests on its supporting surface, a suitable quantity of the sugar flows into the chamber 4 through the opening $o$, and fills said chamber, a small portion gravitating perhaps into the passage-way of the conduit 5. By tilting or tipping the bowl about an axis disposed at right angles to the axis of the conduit 5, and in a direction to depress the spout 6, this measured quantity of the material will be discharged through the spout. By righting the bowl, or bringing its bottom $b$ to a horizontal plane, the material will again gravitate through the opening $o$ into the chamber 4, and this may be discharged in the same manner. With a tilting of the bowl the surface of the contents thereof will dispose itself in a plane at an incline to the axis of the bowl, as for example along the plane $x$—$y$ (Fig. 6); and unless the bowl is very full to start with, there will be practically no tendency on the part of the material in the bowl to discharge into the chamber 4 (through the opening $o$) when the bowl is tilted for purposes of discharge.

Should any quantity however, escape into the measuring chamber when the bowl is discharging in its tilted position, such quantity will be negligible, and in time practically disappears as the contents of the bowl diminishes. The curvature of the passage between the passage-way of the tube 5 and the spout 6 is such that when the bowl is tilted to discharging position, the curved portion of the passage referred to will be sufficiently depressed to allow for a free discharge of the fluent material through the spout. This same curvature (which is upward when the bowl rests on a horizontal surface) prevents accidental escape of the material from the measuring chamber as a result of jars, or on account of moving the bowl from one point to another. For example, it would prevent accidental discharge as the bowl was being passed from one person to another seated at the same table.

From the foregoing it will be seen that with a tipping or tilting of the bowl about an axis transverse to the conduit 5, a measured quantity of the material will be discharged, thereby dispensing with the need of a spoon; at the same time the cap or closure 2 keeps out dirt, dust, flies and like foreign matter and insects. When the bowl is restored to a horizontal position the surface of its contents if sufficiently fluent, occupies a plane substantially as shown by the dotted line $t—t$, (Fig. 5).

Having described my invention, what I claim is:—

1. A container for fluent material having a raised bottom provided with an opening at a point contiguous to the wall of the container and chargeable from a point above said bottom, a measuring chamber below and in communication with said opening, a conduit below said bottom communicating with said chamber at the one end and gently curving upward at its other end to connect with a spout on the outside of the container and near the bottom thereof at a point diametrically opposite said opening, said spout merging directly with said conduit whereby the fluent material in the measuring chamber may be freely discharged through said spout when the container is tilted.

2. A container for fluent material having a raised bottom provided with an opening at a point contiguous to the wall of the container and chargeable from a point above said bottom, a handle for the container adjacent said opening, a measuring chamber below and in communication with said opening, a conduit below said bottom communicating with said chamber at the one end and gently curving upward at its other end to connect with a spout on the outside of the container and near the bottom thereof at a point diametrically opposite said opening and handle, said spout merging directly with said conduit whereby the fluent material in the measuring chamber may be freely discharged through said spout when the container is tilted.

In testimony whereof I affix my signature, in presence of two witnesses.

JOHN M. TRAVIS.

Witnesses:
EMIL STAREK,
JOS. A. MICHEL.